United States Patent [19]

Beall, Jr.

[11] Patent Number: 4,885,085

[45] Date of Patent: Dec. 5, 1989

[54] DIRECT ACTING REVERSE OSMOSIS WATER PURIFIER VALVES

[76] Inventor: Richard W. Beall, Jr., 229 4th Pl., Manhattan Beach, Calif. 90266

[21] Appl. No.: 231,722

[22] Filed: Aug. 12, 1988

[51] Int. Cl.$^4$ .............................................. B01D 13/00
[52] U.S. Cl. ..................................... 210/137; 137/82; 210/195.2; 210/257.2; 210/321.6
[58] Field of Search ................. 210/739, 741, 177, 97, 210/130, 131–133, 137, 143, 195.2, 257.2, 418–420, 422, 423, 428, 321.6; 137/82, 84–86, 154, 455, 505, 505.13, 505.18

[56] References Cited

U.S. PATENT DOCUMENTS

| | | | |
|---|---|---|---|
| 3,989,626 | 11/1976 | Bentley et al. | 210/177 |
| 4,230,579 | 10/1980 | Bray et al. | 210/321.6 |
| 4,778,532 | 10/1988 | McConnell et al. | 210/739 |

Primary Examiner—Frank Sever
Attorney, Agent, or Firm—Blakely, Sokoloff, Taylor & Zafman

[57] ABSTRACT

A direct acting reverse osmosis water purifier valve is disclosed. The purifier valve has a single diaphragm valve responsive to the pure water pressure to shut off the tap water inlet when the pure water pressure approaches the tap water line pressure, indicating that the pure water storage tank is full. This shut-off valve, in conjunction with the venting of the tap water line to drain within the system upon shut-off, results in a self actuating effect causing the shut-off valve to close in a positive manner once closing is initiated. Similarly, a direct acting pilot valve is used to control the squeeze water control valve to respond as desired to the pure water pressure to control the squeeze water for the purification and dispensing cycles. Functioning of the valve is very similar to that of the prior art though with a much simplified and more reliable structure.

11 Claims, 2 Drawing Sheets

DIRECT ACTING REVERSE OSMOSIS WATER PURIFIER VALVES

BACKGROUND OF THE INVENTION

1. Field of the Invention

The present invention relates to the field of water purifiers and, more specifically, to improved compound valves for controlling the operation of reverse osmosis water purifying systems.

2. Prior Art

U.S. Pat. No. 4,176,063 discloses a control valve for reverse osmosis water purifying systems that controls the operation of a system according to the water pressure present in the system's pure water delivery line. The control valve comprises four individual diaphragm valves linked together by hydraulic passages, two of which valves are in essence double diaphragm valves utilizing diaphragms of substantially different size with a mechanical linkage therebetween so that the desired hydraulic pressure ratios can be achieved.

One of the diaphragm valves is a check valve inserted in the pure water delivery line that maintains pressure in the line between the check valve and the spigot when the spigot is closed. Another of the diaphragm valves is a double diaphragm valve functioning as a pilot valve, hydraulically linked to the pure water delivery line such that the pilot valve opens when the pure water pressure is low, i.e. when the dispensing spigot is open. The third diaphragm valve is a squeeze water valve which opens in response to opening of the pilot valve and controls the flow of pressurized waste water from the reverse osmosis unit to a pure water tank in which the pure water is maintained in a bladder. The pressurized waste water is used to pressurize the pure water to provide adequate pure water delivery pressure when the spigot is open. Finally the fourth diaphragm valve, also a double diaphragm valve to get the desired area ratios, is an inlet water valve which controls the inflow of water from the main water line to the system. This inlet valve is closed when the pure water tank is completely filled with pure water, thus cutting off the flow of waste water when not needed.

This prior art control valve has subsequently been improved by the addition of two additional valves. The first of these, a duck bill valve, assures that there is always a limited flow of waste water through the reverse osmosis unit to remove salts and other impurities from the unit's filter membrane whenever water is being filtered, a function provided by a separate constriction elsewhere in the system in accordance with the disclosure of the '063 Patent. The second additional valve, a diverter valve, allows squeeze water in the pure water tank to flow to a drain to eliminate the back pressure in the pure water during the filtering process.

The prior art control valve, particularly as improved, functions very well for the intended purpose. The double diaphragm valves, however, having a mechanical linkage therebetween, tend to make the overall assembly relatively large, with much of the complexity thereof being associated with these double diaphragm valves and the mechanical linkage therebetween. Further, as shown in the '063 Patent and as in actual equipment manufactured and sold in accordance with the patent, one of the two diaphragms for each of the double diaphragm valves was a flat sheet rubber deflectable upward or downward, as conditions dictated. Because of the lack of convolutions therein, the diaphragm deflection of these flat diaphragms also creates substantially radial tension and sharp deflections adjacent the regions of support of the diaphragms, thereby encouraging failure thereof by cracking, etc. Also, because of the lack of peripheral sealing ring on the flat sheet diaphragms, leakage of water from the valve assembly, when it occurred, frequently would be associated with the flat diaphragms and the difficulties in attempting to obtain a good seal by the mere clamping of the peripheral edge thereof. Obviously, these flat diaphragms and the associated support thereof could be modified to allow the use of convoluted diaphragms having a peripheral seal ring thereon to improve the reliability thereof, though the additional diaphragm and the mechanical separator for the two diaphragms in each of the two double diaphragm valves still would add substantially to the size, complexity and cost of the valve assembly over that of the present invention.

BRIEF SUMMARY OF THE INVENTION

A direct acting reverse osmosis water purifier valve is disclosed. The purifier valve has a single diaphragm valve responsive to the pure water pressure to shut off the tap water inlet when the pure water pressure approaches the tap water line pressure, indicating that the pure water storage tank is full. This shut-off valve, in conjunction with the venting of the tap water line to drain within the system upon shut-off, results in a self actuating effect causing the shut-off valve to close in a positive manner once closing is initiated. Similarly, a direct acting pilot valve is used to control the squeeze water control valve to respond as desired to the pure water pressure to control the squeeze water for the purification and dispensing cycles. Functioning of the valve is very similar to that of the prior art though with a much simplified and more reliable structure.

DETAILED DESCRIPTION OF THE INVENTION

Figure 1:
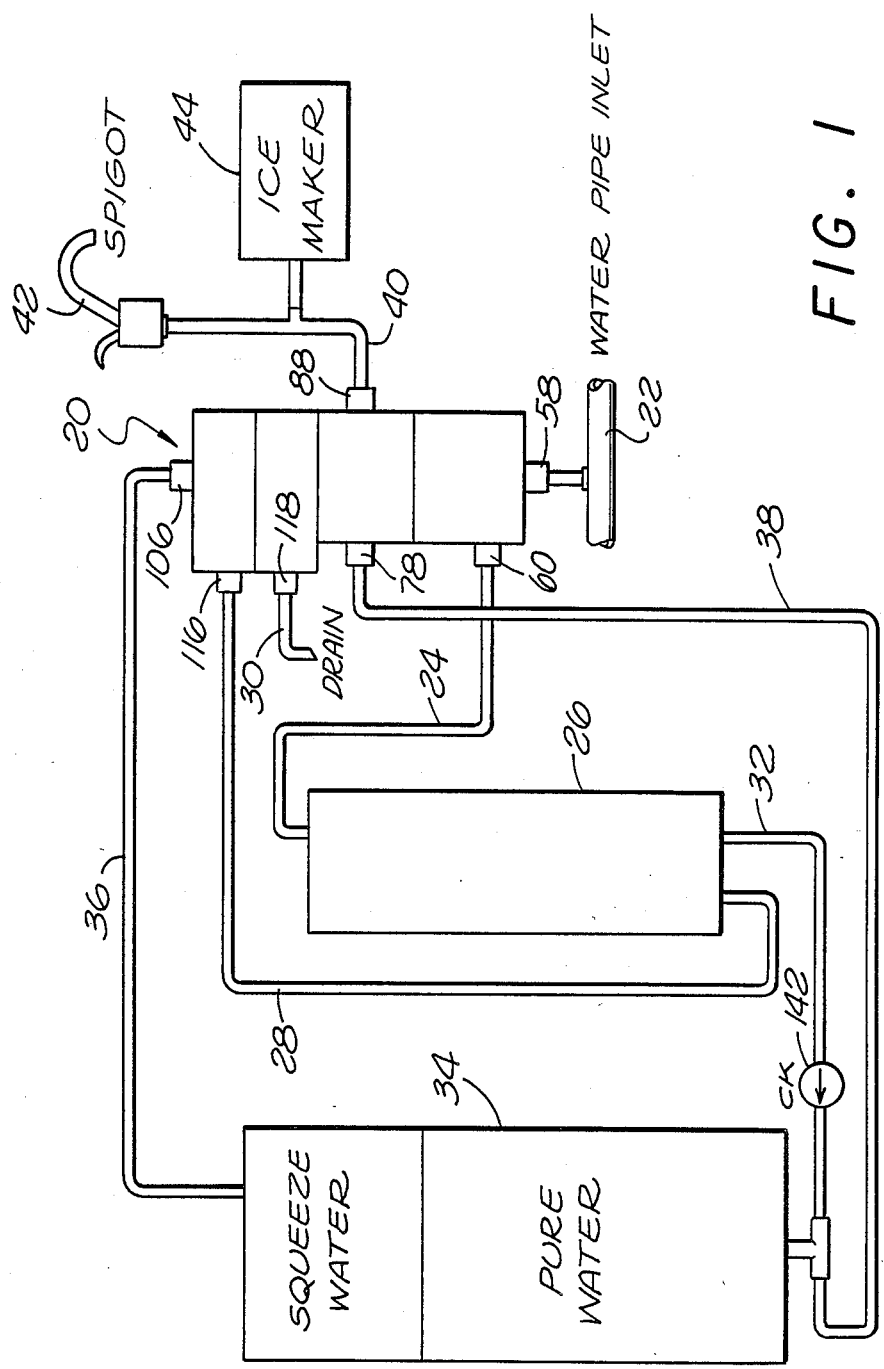
FIG. 1 is a schematic diagram of a typical water purifier system utilizing the valve of the present invention.

The present invention is a valve assembly similar in function to that of U.S. Pat. No. 4,176,063 and usable in a reverse osmosis purifying system of the general type shown in FIG. 1. The valve 20 of the present invention, as shown therein, controls the water coming into the system from water line 22 into line 24 providing the raw water to the reverse osmosis unit 26. The valve 20 also controls the amount of the inlet water which is passed through the reverse osmosis unit and discharged to drain through lines 28 and 30. The valve further controls the flow of pure water through the line 32 into the storage tank 34, in part by controlling the pressure of the squeeze water in the tank 34 by control of the pressure in line 36, and in part by turning the inlet water off when the tank 34 is full of pure water. In that regard, the storage tank 34 is of the type having a collapsible membrane therein separating the pure water and the squeeze water so that the pressure between these two chambers will be equalized even though the water in the two chambers defined by the membrane is prevented from intermixing thereby. In general, the various functions of the valve 20 are responsive in part to pressure in the purified water outlet lines 38 and 40 as controlled by the use of the pure water, such as by a spigot 42 or an ice cube maker 44 attached to the outlet line 40.

Figure 2:
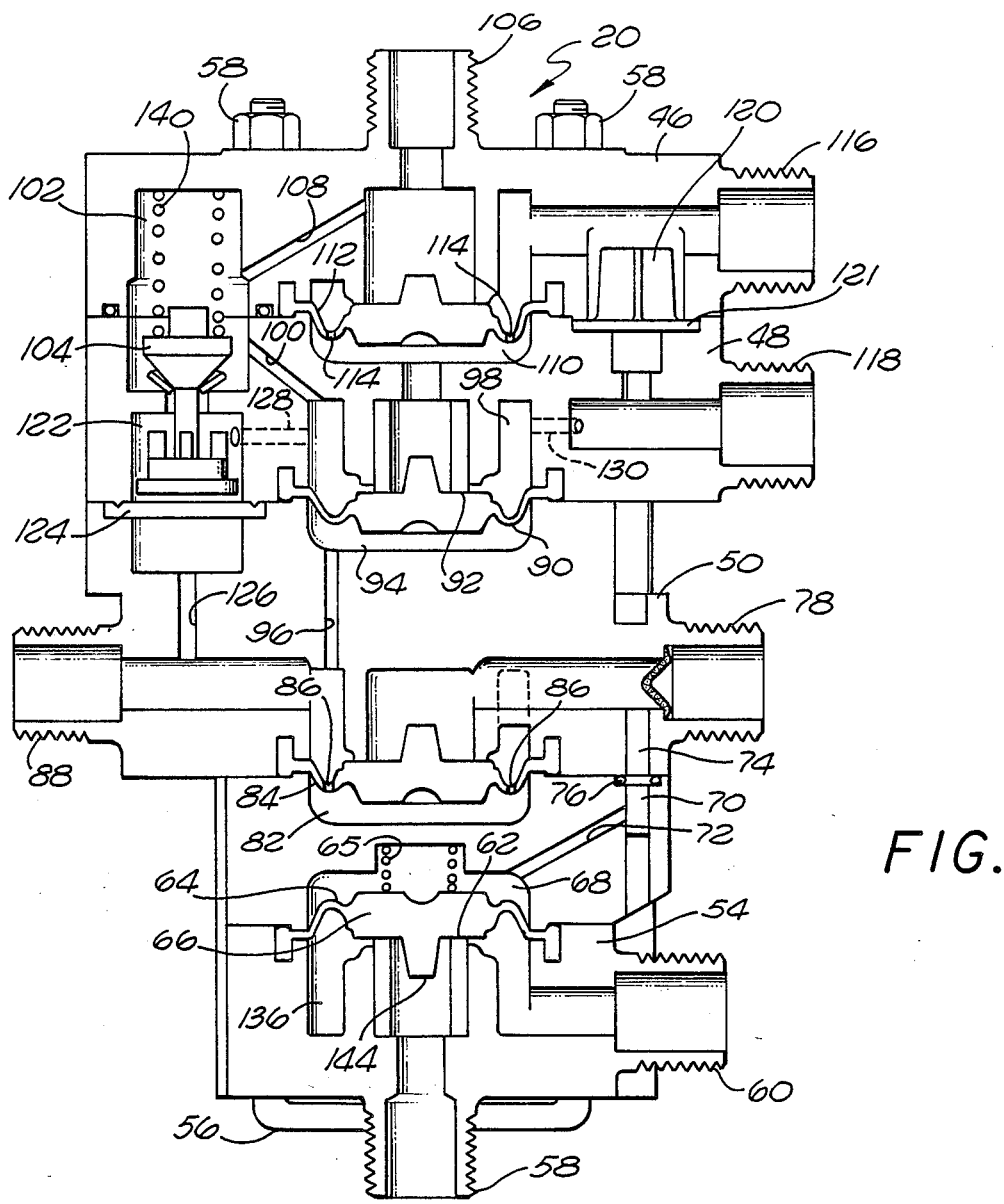
FIG. 2 is a cross-section of the water purifier control valve of the present invention.

Now referring to FIG. 2, a cross section of the preferred embodiment of the present invention control valve 20 may be seen. The valve assembly is comprised of five major valve body parts, namely members 46, 48, 50, 52 and 54 clamped together in a stack by two U bolts 56 and nuts 58. (See also FIG. 3). Starting from the bottom up, body member 54 has integral line fittings 58 and 60 thereon for connection to a public water line and to a reverse osmosis unit, respectively. The opening through connection 58 is in communication with a valve seat 62 of significantly smaller diameter than the corresponding valve seat in the valve assembly of the '063 patent. In that regard, while the smaller valve seat could restrict the flow therethrough, in general the valve seat will not be the smallest part of the line water connection anyway, and the maximum inlet flow rate needed in any event is only that required to satisfy the appliances connected to the freshwater outlet, most typically a spigot for dispensing drinking water and a connection to an automatic ice cube maker, neither of which require very high flow rates for satisfactory operation.

Positioned above valve seat 62 and trapped between body members 54 and 52 is a diaphragm 64 having a center section 66 which cooperates with the valve seat 62 to prevent flow therethrough whenever the forces thereon force the same against the valve seat. Diaphragms of the type shown are readily commercial available and generally have a brass disk molded into the rubber in region 6 to provide rigidity thereto so that the same will not significantly deflect even if the differential forces thereon force the same hard against the valve seat.

The space 68 above the diaphragm 64 defined by an appropriate depression in the bottom of member 52 is in communication with an opening 70 molded into member 52 through a hole 72 drilled in member 52 after molding. The opening 70 in member 52 is in communication with a corresponding opening 74 in member 50 and sealed by way of O-ring 76 in an appropriate O-ring groove molded into the top surface of member 52. Opening 74, on the other hand, is in direct communication with the port through connection 78 forming the pure water inlet to the valve for connection to line 38 (see FIG. 1) of the system. The port through connection 78 is itself in communication with valve seat 80 in body member 50 facing a cooperative space 82 formed by an appropriate depression in the upper face of member 52. Clamped between members 52 and 50 is another diaphragm 84, this one a Dole diaphragm modified to have no central opening therethrough, but having openings 86 therethrough so as to allow the equalization of pressures on each side of the outer region of the diaphragm. Thus, the port through connection 88 is basically in communication with the entire lower side of the diaphragm as well as the annular peripheral area thereof so that only the differential pressure within the diameter of the valve seat 80 results in an unbalanced force on the diaphragm forcing the diaphragm firmly against the valve seat in one instance, or forcing the diaphragm away from the valve seat for opposite differential pressures. The action of the diaphragm on the valve seat is that of a check valve, allowing flow from connection 78 to connection 88 but preventing flow in the opposite direction. In use, this of course is a check valve for the pure water, pure water being delivered from the storage tank under pressure of the squeeze water to the port through connection 78 and delivered from the port through connection 88 to the dispensing spigot, with the check valve preventing any back flow and possible contamination which could result therefrom, and maintaining pressure in the outlet line to the dispensing valve when the squeeze water is vented to drain and therefore the pure water in the storage tank is not pressurized.

Positioned between body member 50 and body member 48 is another diaphragm 90 operative with a valve seat 92 in the body member 48. The lower side of the diaphragm 90 faces a chamber 94 in fluid communication through opening 96 with the pure water in the outlet from the valve assembly (see FIG. 1). The upper peripheral region of the diaphragm 90 faces an annular chamber 98 in fluid communication through opening 100 with a chamber 102 above a diverter valve 104. Chamber 102 is also in communication with the squeeze water connection 106 through a relatively small opening 108 in body member 46. The upper central area of the diaphragm 90 within the area of valve seat 92 is in fluid communication with chamber 110 between body members 48 and 46, wherein the final diaphragm 112 is retained. This diaphragm, like diaphragm 84, is a modified Dole diaphragm closed in the center and having small openings 114 through the peripheral regions thereof. The upper peripheral region of the diaphragm is in fluid communication with the port through connection 116 which, as may be seen in FIG. 1, is connected to the output line 28 of the reverse osmosis unit. In that regard, the output line 28 is not the pure water line but rather is the flow through of unpurified water from the reverse osmosis unit which keeps the same from becoming clogged by removing the higher concentration of impurities which otherwise would accumulate to unacceptable levels in the reverse osmosis unit. Also in fluid communication with the port through connection 116 is an opening to connection 118, normally connected to drain, with a duck bill flow restricter 120 in the opening between connections 116 and 118 and oriented so as to highly restrict the flow therethrough from connection 116 to connection 118. The duck bill restrictor 120, a commercially available part, is a flexible member in the general shape of a real duck bill on a mounting base 121, with the bill portion having a small groove therein to define a small leakage path when the differential pressure between connections 116 and 118 holds the bill closed. Without a pressure differential thereon, the bill opens, giving the same a self cleaning effect to avoid clogging of the leakage path defining the desired flow restriction over a period of time.

Finally, a diverter valve 104 operates in conjunction with an opening through a wall in body member 48 between chamber 102 and chamber 122. The diverter valve is normally maintained in the closed position by coil spring 102, though it may be forced to the open position by the deflection of a flat diaphragm 124 between body members 50 and 48 as actuated by pressure through opening 126 extending between the pure water outlet of the valve assembly and the lower side of diaphragm 124. The chamber 122 between the diverter valve and diaphragm 124 is vented to drain through holes 128 and 130. These holes are drilled into body member 48 after the molding thereof and permanently plugged to bypass region 98 to vent region 122 below the diverter valve directly to drain as desired.

Figure 3:
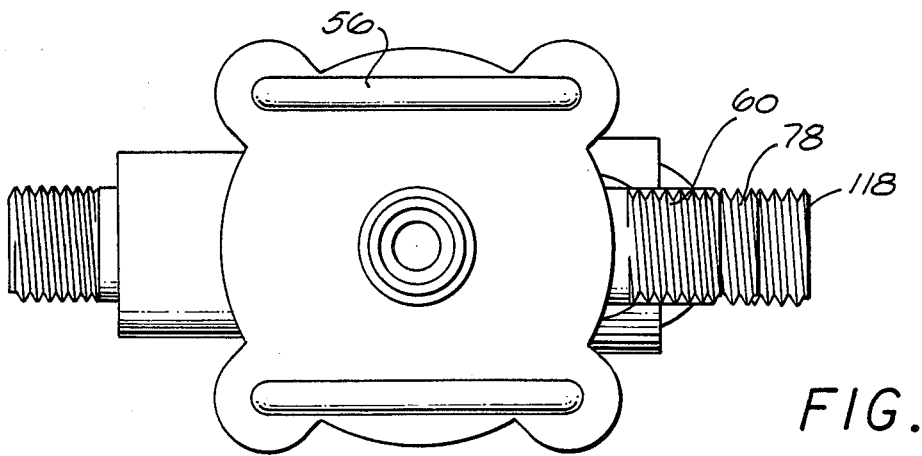
FIG. 3 is an end view of the valve of FIG. 2.

Now referring to FIG. 2 again, the operation of the tap water shut-off valve, the lowest valve in the valve assembly of FIG. 3, will now be described. Assume for the moment that pure water is currently being dispensed. The open dispenser spigot drops the pressure of the pure water in the ports through connections 78 and 88, with the low pressure being communicated through ports 74 and 72 to chamber 68 above diaphragm 64. Under these conditions the pressure in the inlet water line coupled to connection 58 forces the diaphragm 64 off of the valve seat 62, coupling line water pressure through port 60 and line 24 to the reverse osmosis unit 26 (see FIG. 1 also), part of which passes through the reverse osmosis membrane and then through pure water line 32 to the storage tank 34, with a somewhat larger part also passing straight through as waste water through line 28 to connection 116 on the valve assembly of FIG. 2.

The low pressure of the pure water during dispensing allows the diverter valve 104 to close under the force of the coil spring 140. In addition, the low pressure of the pure water is communicated through port 96 to chamber 94 below diaphragm 90. Because the reverse osmosis unit is pressurized by line water, so also is the waste water line 28 therefrom coupled to connection 116. In addition to causing a small waste water flow to the drain port connection 118 through the duck bill 120, the high pressure on the waste water line through connection 116 is communicated through openings 114 in diaphragm 112 to the center of the diaphragm 90, forcing the same off of its seat 92, thereby opening the valve defined by the diaphragm and valve seat. This in turn causes diaphragm 112 to move to a lower position under the effect of the pressures thereon (the flow through openings 114 in the diaphragm being highly restricted), thereby allowing the high pressure waste water coupled through connection 116 to be coupled to connection 106 and through line 36 to the squeeze water portion of the reservoir 34.

When dispensing stops, pressure of the pure water increases. This increase in the pure water pressure opens diverter valve 104, bleeding off the squeeze water pressure in region 98 above diaphragm 90 through port 100, the diverter valve and ports 128 and 130 to drain. Now the higher pressure pure water under diaphragm 90 causes the same to be forced against the seat 92, which in turn causes the high pressure water from the reverse osmosis unit coupled through connection 116 to pass through openings 114 in diaphragm 112, pressurizing the lower side of the diaphragm to force the same against the adjacent seat to shut off the supply of squeeze water. Then the open diverter valve bleeds the squeeze water pressure in storage tank 34 off through port 108, the diverter valve, and ports 128 and 130 to drain. While squeeze water pressure may momentarily remain relatively high when the dispensing first stops, the flow restriction provided by the small port 108 immediately results in a relatively low pressure in chamber 102 above the diverter valve, which low pressure is communicated through port 100 to the diaphragm 90 resulting in the closing of the same as described.

In the present invention the diameter of the seat 92 is purposely made relatively small, particularly in comparison to the pilot valve of the prior art, so that the pure water pressure during purification, while still not very high, will be adequate to force diaphragm 90 against seat 92 to close the same. In that regard, one aspect of the present invention is the recognition that the amount of flow required through the pilot valve to control the squeeze water valve defined by diaphragm 112 is quite low because of the relatively small size of openings 114 therein, and that accordingly a small diameter valve seat for seat 92 will be adequate for the functioning of the valve, particularly in light of the specific porting used therein, primarily the small port 108, port 100 and the two ports 128 and 130 between the diverter valve and drain.

When the storage tank 34 is full of pure water, pure water pressure will rise toward the water supply line pressure. As a first order approximation, pure water pressure will closely approach the water supply line pressure. On the other hand, the pressure in the port through connection 58 will be the water line pressure, with the pressure in region 136 also approaching water line pressure so that there are no apparent unbalanced forces on diaphragm 64 to move the diaphragm down against the valve seat 62 to close the water inlet valve. It is for this reason that the prior art used a double diaphragm arrangement with a mechanical linkage therebetween so that the diaphragm exposed to the pure water pressure could be bigger in diameter than the underside of diaphragm 64 exposed to the water supply line pressure. However, the present invention overcomes this difficulty without using a double diaphragm arrangement by a combination of a number of factors to assure the proper closing of the inlet water valve. In particular, the valve is preferably designed so that the neutral state of diaphragm 64 is with the lower face thereof against seat 62. Thus, the diaphragm by itself will have some tendency to return to the closed position unless differential pressures maintain the same away from the valve seat. In that regard, the only time this valve is open is during purification and dispensing of pure water, which typically represents only a small percentage of the total operating time. Once the pure water storage tank is filled, the valve will be closed by design. Consequently, any relaxation of the diaphragm rubber with time will not significantly effect this neutral position of the diaphragm, as its most common location is at or substantially at that neutral position. In addition, the face of valve seat 62 is purposely given a relatively small inner diameter. Consequently, as the reservoir 34 becomes filled with pure water and the pure water pressure water approaches inlet water line pressure, there will be very little differential pressure on the diaphragm 64. Thus the diaphragm will drift toward the closed position. While the rate of water purification and thus the water flow through the reverse osmosis membrane will reduce to very low levels, the flow of waste water through the duck bill 120 to drain will in general not change. This flow, provided through the inlet water control valve, sustains a flow between the valve seat 62 and the adjacent center region of diaphragm 64. The velocity of this flow apparently reduces the pressure on this region of the diaphragm, causing the diaphragm to move further toward the closed position. This restricted flow also results in a drop in the pressure in region 136, though check valve 142 prevents a corresponding drop in the pure water pressure in the valve assembly. Consequently, the pure water pressure forces diaphragm 64 downward further, further reducing the pressure in region 136 and through the port in connection 60 because of the increasing flow restriction over the valve seat in combination with the fixed flow restriction of the duck bill.

The net result is that once the valve defined by diaphragm 64 and valve seat 62 starts to close as determined by the free position of the diaphragm 64 and other design parameters, and the dynamic flow effects between the valve seat and the adjacent diaphragm valve, the closing action is self actuating, until when the valve is closed, the high pure water pressure on the top of the diaphragm 64 tightly forces the valve closed against the water line pressure in the port through connection 58 as communicated to the internal region of the valve seat, the pressure in region 136 essentially dropping to atmospheric pressure by effectively being vented thereto by the duck bill 120.

It should be noted that at least some commercially available diaphragms of the type shown for diaphragm 64 have a central region 144 thereon, but this normally is of little consequence given the diameter of valve seats typically used therewith. It is possible that in the present invention, this in cooperation with the relatively small diameter valve seat helps in initially dividing the flow and in providing higher velocity and thus lower pressure flow between the protrusion 44 and the inner diameter of the valve seat to the advantage of the desired valve closure action. In any event, it has been found that when operating at a 60 psi water inlet line pressure, the inlet water valve of the present invention will remain open until the pure water pressure reaches approximately 80 percent of the water inlet line pressure, at which time the valve automatically closes, apparently under the influences hereinabove discussed, and remains positively closed until the pure water pressure drops as a result of some use thereof. When operating at a 100 psi line pressure the inlet water valve of the present invention will remain open until pure water pressure reaches approximately 95 percent of the water inlet line pressure, again automatically closing at that point. In any event, test units have been operated in accordance with the design of the present invention without any detected failure of the valve to close under any of the varying line pressures encountered. Of course one could, if desired, place a small compression spring 65 between the top of diaphragm 64 and the adjacent upper wall of cavity 68 to provide and increase the self closing tendency. Such a spring might, by way of example, represent just a view psi drop across the inlet valve during purification when the pressure in region 68 above the diaphragm is substantially zero so as to not significantly effect the purification rate or efficiency, yet would in all cases assure that the valve started to close and thus closed by self actuation with a larger and definite margin under all line pressure conditions. A somewhat stronger spring, on the other hand, would cause the inlet water supply to be shut off well below line pressure, which may be desireable in some applications. Again however, whether the means for closing the line water inlet valve when pure water pressure starts to approach the inlet water line pressure is merely a combination of various factors such as the small valve seat diameter, the shape of the facing side of the diaphragm, etc., or further includes a coil spring to aid in the closure of the valve, it is clear from the present invention and the test results thereon that the desired action may readily be achieved without the use of a double diaphragm arrangement with a mechanical linkage therebetween to provide an area ratio between the pure water side and the line water side of the diaphragm arrangement. The net result of course is a substantial improvement in the cost, complexity and reliability of the resulting product. While improvements in all three are important, improvements in reliability are particularly important, as reverse osmosis systems of the general type described are usually installed as "permanent" installations, so that a premature failure of a valve will generally require an expensive housecall by a qualified service man, as opposed to the consumer merely bringing their product to a repair depot or sending the same back to the manufacturer for repair.

There has been disclosed and described herein a new and unique direct acting reverse osmosis water purifier valve for hydraulicly operated reverse osmosis purification and dispensing systems having a simplified structure. While the embodiment shown eliminates both double diaphragm valves of the prior art, obviously elimination of either alone is also a useful improvement over the prior art. Thus, while the preferred embodiment of the invention has been disclosed and described herein, it will be understood by those skilled in the art that various changes in form and detail may be made therein without departing from the spirit and scope of the invention.

I claim:

1. A reverse osmosis water purifier system comprising:
   a reverse osmosis water purifier element having an inlet means for pressurized tap water, first outlet means for waste water and second outlet means for pure water;
   a pressure resistant storage tank having a flexible bladder therein dividing the tank into a pure water chamber and a squeeze water chamber and having a pure water connection and a squeeze water connection to said pure water and squeeze water chambers, respectively;
   first valve means for coupling between a source of water under pressure, said squeeze water connection on said storage tank and a drain line, said first valve means being a means for coupling said source of water under pressure to said squeeze water connection when pure water is to be used, and for coupling said squeeze water connection to said drain line when pure water is being accumulated in said storage tank;
   a flow restriction between said first outlet means of said reverse osmosis water purifier element and a drain line;
   means for coupling to a pressurized tap water supply;
   second valve means coupled between said means for coupling to a pressurized tap water supply and said inlet means of said reverse osmosis water purifier element for controlling the flow of water therebetween responsive to the pressure of pure water from said storage tank, said second valve means being a single first diaphragm valve having a valve seat having a central region circumscribed by said valve seat and a peripheral region surrounding said valve seat, one of said central and peripheral regions being in fluid communication with said means for coupling to a pressurized tap water supply, and the other of said regions being in fluid communication with said inlet means of said reverse osmosis water purifier element, said second valve means also having a diaphragm having first and second sides thereof, said diaphragm being supported so that said first side thereof is adjacent said valve seat, said second side of said diaphragm being in fluid communication with pure water from said storage tank and responsive to the pressure thereof; and means for maintaining pure water pressure in at least part of said purifier system including that which is in fluid communication with said second side of said diaphragm when said second valve means is closed;

said second valve means includes means for beginning to close as the pure water pressure approaches the tap water pressure, for being self actuating to completely close as flow through said flow restriction reduces the pressure in the inlet means of the reverse osmosis water purifier element.

2. The reverse osmosis water purifier system of claim 1 wherein said central region of said valve seat of said second valve means is in fluid communication with said means for coupling to a pressurized tap water supply.

3. The reverse osmosis water purifier system of claim 2 wherein said first valve means is coupled to said waste water outlet of said purifier element as a source of water under pressure.

4. The reverse osmosis water purifier system of claim 2 wherein said first valve means is a means for coupling to a source of water under pressure through said second valve means.

5. The reverse osmosis water purifier system of claim 4 wherein said first valve means is a pilot valve means having second and third diaphragm valves, said second diaphragm valve having a second diaphragm having first and second sides and responsive to differential pressures between said two sides to force said first side against a second valve seat, said valve seat being coupled to said squeeze water connection on said storage tank, said peripheral region of said first side of said second diaphragm being a means for coupling to a source of water under pressure, said peripheral region of said second diaphragm having at least one small opening therethrough, said third diaphragm valve being coupled between said second side of said second diaphragm and a drain line and having a third diaphragm therein directly responsive to pure water pressure in said storage tank to close said third diaphragm valve when the pressure of pure water in said storage tank reaches a predetermined pressure.

6. The reverse osmosis water purifier system of claim 1 further comprised of spring means for encouraging said diaphragm against said valve seat.

7. A reverse osmosis water purifier system comprising:

a reverse osmosis water purifier element having an inlet means for pressurized tap water, first outlet means for waste water and second outlet means for pure water;

a pressure resistant storage tank having a flexible bladder therein dividing the tank into a pure water chamber and a squeeze water chamber and having a pure water connection and a squeeze water connection to said pure water and squeeze water chambers, respectively;

first valve means for coupling between a source of water under pressure, said squeeze water connection on said storage tank and a drain line, said first valve means being a means for coupling said source of water under pressure to said squeeze water connection when pure water is to be used, and for coupling said squeeze water connection to said drain line when pure water is being accumulated in said storage tank;

said first valve means being a pilot valve means having first and second diaphragm valves, said first diaphragm valve having a first diaphragm having first and second sides and responsive to differential pressures between said two sides to force said first side against a first valve seat, said valve seat being coupled to said squeeze water connection on said storage tank, said peripheral region of said first side of said first diaphragm being a means for coupling to a source of water under pressure, said peripheral region of said first diaphragm having at least one small opening therethrough, said second diaphragm valve being coupled between said second side of said first diaphragm and a drain line and having only one diaphragm therein, said last named diaphragm being directly responsive to pure water pressure in said storage tank to close said second diaphragm valve when the pressure of pure water in said storage tank reaches a predetermined pressure;

a flow restriction between said first outlet means of said reverse osmosis water purifier element and a drain line;

means for coupling to a pressurized tap water supply;

second valve means coupled between said means for coupling to a pressurized tap water supply and said inlet means of said reverse osmosis water purifier element including means responsive to the pressure of the pure water from said storage tank to close as the pure water pressure approaches the tap water pressure.

8. A valve assembly for use in a reverse osmosis water purifier system comprising:

a first diaphragm valve means for responding to pure water pressure from a storage tank to shut off the supply of tap water when the pure water pressure approaches tap water pressure;

a second diaphragm valve means for acting as a check valve to maintain pressure in a pure water outlet line when the pure water pressure from a storage tank decreases;

a third diaphragm pilot valve means responsive to pure water pressure in the pure water outlet line; and a forth diaphragm valve responsive to said pilot valve means for controlling squeeze water in a pure water storage tank;

at least one of said first diaphragm valve means and said third diaphragm pilot valve means being a single diaphragm valve.

9. The valve assembly of claim 8 wherein said first diaphragm valve means is a single diaphragm valve.

10. The valve assembly of claim 8 wherein said third diaphragm pilot valve means is a single diaphragm valve.

11. The valve assembly of claim 8 wherein both said first diaphragm means and said third diaphragm pilot valve means are single diaphragm valves.

* * * * *

UNITED STATES PATENT AND TRADEMARK OFFICE
CERTIFICATE OF CORRECTION

PATENT NO. : 4,885,085
DATED : 12/5/89
INVENTOR(S) : Beall, Jr.

It is certified that error in the above-identified patent and that said Letters Patent is hereby corrected as shown below:

col. 03, line 36    delete "6"    insert --66--

Signed and Sealed this

Twenty-first Day of May, 1991

Attest:

HARRY F. MANBECK, JR.

*Attesting Officer*    Commissioner of Patents and Trademarks